Aug. 7, 1962     W. LEHMANN     3,048,731

ELECTROLUMINESCENT CELL AND METHOD

Filed March 22, 1956

INVENTOR.
WILLI LEHMANN.
BY
ATTORNEY.

United States Patent Office 3,048,731
Patented Aug. 7, 1962

3,048,731
ELECTROLUMINESCENT CELL AND METHOD
Willi Lehmann, East Orange, N.J., assignor to Westinghouse Electric Corporation, East Pittsburgh, Pa., a corporation of Pennsylvania
Filed Mar. 22, 1956, Ser. No. 573,063
9 Claims. (Cl. 313—108)

This invention relates to luminescent material and, more particularly, to a method for rendering luminescent material responsive to an alternating electric field and to an electroluminescent cell which incorporates this field-responsive luminescent material.

Electroluminescent cells were first disclosed by G. Destriau and his original work is summarized in London, Edinburgh, and Dublin Philosphical Magazine, Series 7; No. 285; page 700 (October 1947). The phosphors which are capable of being excited to luminescence by the influence of an alternating electric field have been limited in number. Many different phosphors are known to be either photoluminescent or cathodoluminescent, that is, they are capable of being excited to luminescence by the influence of ultraviolet radiations or electrons, but only a relatively few of these normally luminescent phosphors have proved to be electroluminescent, that is, responsive to the influence of an alternating electric field to electroluminesce. It is of course desirable to be able to use many different types of phosphors in electroluminescent applications because of the different colors with which different phosphors respond to excitation by the alternating field and because of varying stabilities, efficiencies and brightnesses, etc., encountered with different materials. However, as noted, the numbers of phosphors which are capable of being excited to luminescence by an alternating electric field are very limited. It should be noted that by the use of the term "alternating electric field responsive" it is meant that the phosphor is capable of being excited to what appears to the eye to be continuous light emission by the application of an alternating electric field thereacross.

It is the general object of this invention to avoid and overcome the foregoing and other difficulties of and objections to prior art practices by the provision of a method for rendering responsive to an applied alternating electric field, luminescent material which is normally not responsive to an applied alternating electric field.

It is a further object of this invention to provide an electroluminescent cell which incorporates the alternating electric field responsive phosphors of this invention.

The aforesaid objects of the invention, and other objects which will become apparent as the description proceeds, are achieved by providing a method and an electroluminescent cell wherein a phosphor is rendered responsive to an applied alternating electric field by admixing in contacting relationship therewith a finely-divided, sharp-edged metallic material or semi-conductive material. The main limitation to this material addition is that it should have sharp edges and a relaxation time which is not greater than one-half the period for one cycle of the applied alternating electric field. The phosphor material should have a relaxation time which is greater than one-half the period for one cycle of the applied alternating field.

For better understanding of the invention, reference should be had to the accompanying drawing wherein.

Figure 1:
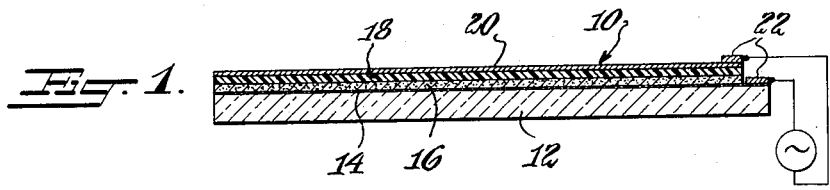
FIG. 1 is a sectional view of an electroluminescent cell incorporating a phosphor according to this invention.

With specific reference to the form of the invention illustrated in the drawing, the numeral 10 in FIG. 1 illustrates generally an electroluminescent cell comprising a backing plate 12 having coated thereover a thin light-transmitting layer of electrically-conducting material 14, which constitutes the first electrode. Coated over electrode 14 is a phosphor layer 16 having admixed therewith an additive material, as hereinafter explained, and coated over this phosphor admixture is a layer 18 of high dielectric material in order to prevent cell breakdown during operation. The individual particles of phosphor and admixture comprising the layer 16 are preferably imbedded in a dielectric material in order to eliminate air spaces therebetween. Coated over the dielectric layer 18 is a second electrode 20. Electrical connection to a source of alternating potential is effected through connecting bus bars 22. Normally the two electrodes will be substantially parallel.

In the embodiment as shown in FIG. 1, the backing plate 12 is preferably fabricated of light-transmititng material such as glass in order that the light generated by the cell may be passed. The other electrode 20 may be also made light-transmitting, if desired, although this is not necessary. The thin, electrically-conductive layer 14 coated over the backing plate 12 may consist of tin oxide, for example, or other suitable electrically-conductive oxides such as those of zinc, cadmium, aluminum, etc. and this coating may be applied by means as outlined in Patent No. 2,522,531 to Mochel, or by other suitable means as are well-known. The layer of phosphor materials 16 is comprised of a phosphor which is normally luminescent, that is, responsive to U.V. or cathode rays to emanate light, but which is normally not electric field-responsive, which phosphor has been rendered electric field responsive by means as hereinafter outlined. The dielectric layer 18 may be of mica, for example, or a suitable high dielectric plastic, such as methyl methacrylate, for example, which dielectric preferably is also encased about the phosphor particles in order to eliminate air spaces therebetween. The second electrode 20 may be of aluminum or silver, for example, as deposited by well-known vacuum-metallizing techniques. Electrical contact to the two electrodes may be effected by bus bars 22 which may be applied by means as outlined in Patent No. 2,624,823 to Lytle, for example.

Figure 2:
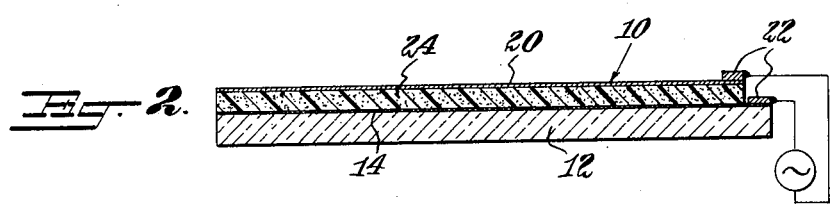
FIG. 2 is an alternative embodiment of a cell construction which incorporates a phosphor according to this invention.

Alternatively, the phosphor may be imbedded throughout the dielectric material rather than being placed in substantially separate layers and such an embodiment is illustrated in FIG. 2, wherein the phosphor material is evenly embedded throughout the dielectric material to form a phosphor-dielectric layer 24. In such an embodiment the dielectric may consist of methyl methacrylate or polystyrene, for example, or other suitable light-transmitting, high-dielectric material. In the embodiment in FIG. 1 the phopshor layer 16 may be 0.1 mm. thick and the dielectric layer may also be 0.1 mm. thick, although these specific examples are not meant to be limiting. In the embodiment as shown in FIG. 2 a phosphor-dielectric layer 24 may be 0.2 mm. thick although this specific example is not meant to be limiting.

In either of the embodiments as illustrated in FIGS. 1 and 2, for an electroluminescent cell which measures 4" on each side, about 3 grams of phosphor may be used and the parts by weight of phosphor and dielectric can be equal. These weights and proportions are given only by way of example and are not intended to be limiting or critical.

It has been found that normally luminescent material which is normally not electroluminescent, that is not electric field-responsive to the average electric fields which may be obtained between two electrodes, may be rendered electric field-responsive by admixing in contacting relationship therewith a finely-divided metallic material or semi-conductive material, which admixed material must necessarily have sharp edges in order to render the luminescent material responsive to an applied electric field. The primary limitation to this sharp-edged material is that it must have a relaxation time which is not greater than one-half the period for one cycle of the alternating electric field which is applied to the cell electrodes. In the case of metallic materials, the relaxation time will always be sufficiently small as to constitute no problem, but in the case of semi-conductive materials, this relaxation time limitation time becomes the factor. By way of explanation, the relaxation time for a material may be defined by the formula: relaxation time (in seconds) equals dielectric constant divided by four pi times $9 \cdot 10^{11}$ times conductance in mhos. The reason for this relaxation time limitation is because the electric field which excites the luminescent material emanates from the sharp edges of the metallic or semi-conductive material which is admixed with and in contacting relationship with the phosphor. The relaxation time is in essence a measurement of that time which the admixed material requires to become a dipole and thus emanate intense electric fields from the sharp edges on this material which fields may be as much as $10^4$ times the average applied field. If the semi-conductive material does not become a dipole, the intense electric field required to excite the luminescent material will not be formed. With metals, the relaxation time is not a limitation, since for any practical field frequency the metallic particle relaxation time is sufficiently small that the metal particles will always become dipoles, but for semi-conductors this does constitute a limitation. It should be noted that in order to form the intense field required to render the normally-luminescent, non-electroluminescent material responsive to the applied electric field, the luminescent material should have a relaxation time which is greater than one-half the period for one cycle of the applied field, in order that the luminescent material does not also become a dipole. The conductivity for most luminescent materials is quite low so that the relaxation period for the luminescent material will normally be quite long.

The size of the finely-divided metallic or semi-conductive material which is admixed with the luminescent material is not particularly critical. For example, particles having an average diameter as small as 0.1 micron are operative and the particle size for the contacting material may be just slightly less than the thickness of the phosphor layer, or the thickness of the phosphor-dielectric layer, whichever embodiment is used. Of course, the dielectric material is still needed to insulate the admixed metallic or semi-conductive material from bridging the electrodes to prevent the cell from being shorted out. The amount of contacting luminescent material is not particularly critical and, as a specific example, from 5% by weight to 50% by weight of the phosphor material of added metallic or semi-conductive material may be used and 25% by weight of added material has been used extensively. It should be noted, however, that these weights of added material are not to be considered as a limitation since even one percent, or less, by weight of the phosphor will produce some degree of luminescence in the normally non-field-responsive luminescent material. The same is true of additive concentrations greater than the 50% figure. Also, sharp-edged metallic and semi-conductive material may be admixed in the same cell, if desired.

Following is a list of photoluminescent materials which have been rendered electric field responsive by admixture with a metal or semi-conductive material. It is possible that some of these phosphor materials may have been reported in some publications as electroluminescent, perhaps due to some special technique of preparation, but these materials are all normally non-electroluminescent.

| Phosphor (Matrix and Activator) | Luminescence | | | Electroluminescence | |
|---|---|---|---|---|---|
| | 2,537 A.U. | 3,650 A.U. | Cathode Ray | Pure Phosphor | Mixed with Additive |
| ZnS—Ag(0.03%) | blue | blue | | | blue. |
| ZnS—Mn(1%) | yellow | yellow | | | yellow. |
| (ZnCd)S—Cu | do | do | | | green. |
| (ZnCd)S—Ag | do | do | | | yellow green. |
| CaS—Bi | blue | blue | | | blue. |
| (CaSr)S—Bi | do | do | | | Do. |
| Zn$_2$SiO$_4$—Mn | green | green | | | green. |
| Cd$_2$SiO$_4$—U—Sm | pink | brown | | | Do. |
| Zn$_2$SiO$_4$—V | white | yellow | | | Do. |
| CaWO$_4$—Pb | do | do | | | white. |
| Cd$_2$B$_2$O$_5$ | red | red | | | red. |
| CaPO$_4$SO$_4$—Tl | white | brown | | | green. |
| Anthracene | blue | blue | | | blue. |
| ZnS—Bi(0.01%) | blue white | blue white | | | blue white. |
| Be(PO$_4$)$_2$—Sn | white | white | | | white. |
| Li$_4$SO$_4$—Ti(1%) | | | blue | | blue. |

All of these phosphor materials as used were finely-divided, with average particle sizes ranging from less than 1 micron to over 100 microns. These average particle sizes for the finely-divided phosphor materials are not meant to be limiting and are only given by way of example.

The additive materials which have been utilized with the foregoing phosphors are copper, maganese, cobalt, zirconium, titanium, nickel, tantalum, iron, bismuth, beryllium, thorium, niobium, antimony and aluminum. Semiconducting materials may be added to render the material field-responsive, such as zinc oxide, copper sulfide, silver sulfide, chromium oxide, iron oxide, iron hydroxide, nickel oxide, stannous arsenide and stannic arsenide. The additive materials may be admixed, if desired, e.g. 10% Cu and 10% Cu$_2$S by weight of phosphor.

Figure 3:
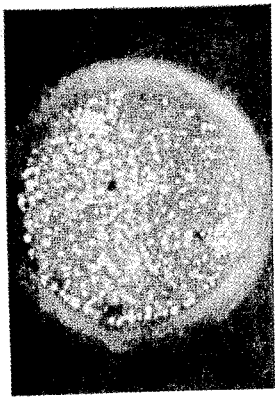
FIG. 3 is a photograph of an operating electroluminescent cell incorporating a phosphor according to this invention.

In FIG. 3 is illustrated an electroluminescent cell constructed as per the embodiment illustrated in FIG. 2 and incorporating a luminescent material which has been admixed with the metallic or semi-conductive material. In the cell as illustrated, the phosphor is zinc sulphide activated by manganese and the additive material is copper. As observed, field responsive luminescence occurs at a plurality of small points where the sharp edges of the additive material are contacting the finely-divided phosphor particles.

Figure 4:
FIG. 4 is a photomicrograph of metal powders which are suitable for rendering electric field-responsive luminescent material which is normally not responsive to an applied electric field.

In FIG. 4 is illustrated a photomicrograph of the finely-divided copper which was admixed with the phosphor to produce the cell from which the photograph in FIG. 3 was taken. As observed, this finely-divided copper, which may be produced by collecting filings, for example, possesses a plurality of sharp edges from which an intense electric field may emanate. The points at which the sharp edges of the additive material contact the phosphor produce small intense light spots, with the rest of the phosphor material remaining non-electroluminescent.

Figure 5:
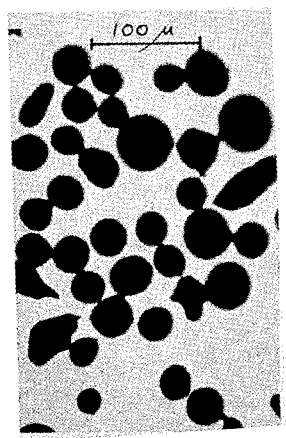
FIG. 5 is a photomicrograph of finely-divided materials which are not suitable for rendering normally non-electroluminescent phosphor materials responsive to an applied electric field.

In FIG. 5 is illustrated finely-divided copper which has a substantially rounded configuration. When such finely-divided copper which has substantially no sharp edges is admixed with the same phosphor material as was used in making the cell from which the photograph in FIG. 3 was taken, no electric field responsiveness is observed since there are no sharp edges from which an intense field may emanate.

It will be recognized that the objects of the invention have been achieved by providing a method for rendering responsive to an applied alternating electric field a normally luminescent material which is normally not responsive to an applied alternating electric field. In addition there has been provided an electroluminescent cell which incorporates the electric field-responsive phosphor of this invention.

While in accordance with the Patent Statutes one best known embodiment of the invention has been illustrated and described in detail, it is to be particularly understood that the invention is not limited thereto or thereby.

I claim:

1. The method of rendering responsive to an applied alternating electric field a finely-divided luminescent material which is normally not electroluminescent responsive to an applied alternating electric field and which has a relaxation time which is greater than one-half the period for one cycle of said alternating field, comprising physically admixing in contacting relationship with said luminescent material an additive material of at least one of the group consisting of finely-divided metallic material and finely-divided semi-conductive material, said finely-divided additive material having sharp edges and a relaxation time which is no greater than one-half the period for one cycle of said alternating field.

2. The method of rendering reponsive to an applied alternating electric field a finely-divided photoluminescent material which is normally not electroluminescent responsive to an applied alternating electric field and which has a relaxation time which is greater than one-half the period for one cycle of said alternating field, comprising physically admixing in contacting relationship with said luminescent material an additive material of at least one of the group consisting of finely-divided metallic material and finely-divided semi-conductive material, said finely-divided additive material having sharp edges and a relaxation time which is no greater than one-half the period for one cycle of said alternating field.

3. An electroluminescent cell comprising two electrodes, at least one of which is light transmitting, and having a finely-divided phosphor and a dielectric material sandwiched therebetween, said electrodes being adapted to have an alternating electric field applied therebetween, said phosphor being normally luminescent and normally not electroluminescent responsive to an alternating electric field applied thereacross, said phosphor having a relaxation time which is greater than one-half the period for one cycle of any alternating electric field to be applied thereacross, an additive material of at least one of the group consisting of finely-divided metallic material and finely-divided semi-conductive material physically admixed in contacting relationship with said phosphor, said finely-divided additive material having sharp edges and a relaxation time which is no greater than one-half the period for one cycle of any alternating electric field to be applied thereacross.

4. An electroluminescent cell comprising two electrodes and having separate layers of finely-divided phosphor and dielectric material sandwiched therebetween, the electrode which is adjacent to the phosphor layer being light-transmitting, said electrodes being adapted to have an alternating electric field applied therebetween, said phosphor being normally luminescent and normally not electroluminescent responsive to an alternating electric field applied thereacross, said phosphor having a relaxation time which is greater than one-half the period for one cycle of any alternating electric field to be applied thereacross, an additive material of at least one of the group consisting of finely-divided metallic material and finely-divided semiconductive material physically admixed in contacting relationship with said phosphor, said finely-divided additive material having sharp edges and a relaxation time which is no greater than one-half the period for one cycle of any alternating electric field to be applied thereacross.

5. An electroluminescent cell comprising two electrodes at least one of which is light transmitting, and having a layer of admixed finely-divided phosphor and a light-transmitting dielectric material sandwiched therebetween, said electrodes being adapted to have an alternating electric field applied therebetween, said phosphor being normally luminescent and normally not electroluminescent responsive to an alternating electric field applied thereacross, said phosphor having a relaxation time which is greater than one-half the period for one cycle of any alternating electric field to be applied thereacross, an additive material of at least one of the group consisting of finely-divided metallic material and finely-divided semi-conductive material physical admixed in contacting relationship with said phosphor, said finely-divided additive material having sharp edges and a relaxation time which is no greater than one-half the period for one cycle of any alternating electric field to be applied thereacross.

6. The method of rendering responsive to an applied alternaitng electric field a finely-divided luminescent material which is normally not electroluminescent responsive to an applied alternating electric field and which has a relaxation time which is greater than one-half the period for one cycle of said alternating field, comprising embedding in light-transmitting dielectric a physical admixture of said luminescent material and an additive of finely-divided and sharp-edged metallic contacting said luminescent material.

7. The method of rendering responsive to an applied alternating electric field a finely-divided luminescent material which is normally not electroluminescent responsive to an applied alternating electric field and which has a relaxation time which is greater than one-half the period for one cycle of said alternating field, comprising embedding in light-transmitting dielectric a physical admixture of said luminescent material an additive of finely-divided and sharp-edged semi-conductive material having a relaxation time which is no greater than one-half the period for one cycle of said alternating field and contacting said luminescent material.

8. An electroluminescent cell comprising two electrodes, at least one of which is light transmitting and having a finely-divided luminescent material and a dielectric sandwiched therebetween, said electrodes adapted to have an alternating potential applied thereto to create an alternating electric field therebetween, said luminescent material being normally not electroluminescent responsive to an alternating electric field applied thereacross, said luminescent material having a relaxation time which is greater than one-half the period for one cycle of any alternating electric field to be applied thereacross, and an additive of finely-divided and sharp-edged metallic material physically admixed in contacting relationship with but not otherwise incorporated into said luminescent material, whereby said luminescent material is rendered electroluminescent responsive to an alternating electric field applied thereacross.

9. An electroluminescent cell comprising two electrodes, at least one of which is light transmitting, and having a finely-divided luminescent material and a dielectric material sandwiched therebetween, said electrodes adapted to have an alternating electric potential applied thereto create an alternating electric field therebetween, said luminescent material being normally not electroluminescent responsive to an alternating electric field applied thereacross, said luminescent material having a relaxation time which is greater than one-half the period for one cycle of any alternating electric field to be applied thereacross, and an additive material of finely-divided and sharp-edged semi-conductive material physically admixed in contacting relationship with but not otherwise incorporated into said luminescent material, said additive semi-conductive material having a relaxation time which is greater than one-half the period for one cycle of any alternating electric field to be applied thereacross, whereby said luminescent material is rendered electroluminescent responsive to an alternating electric field applied thereacross.

References Cited in the file of this patent
UNITED STATES PATENTS

| | | |
|---|---|---|
| 2,566,349 | Mager | Sept. 4, 1951 |
| 2,755,406 | Burns | July 17, 1956 |